E. S. WATSON.
FISHING APPARATUS.
APPLICATION FILED AUG. 10, 1917.
1,284,508.
Patented Nov. 12, 1918.
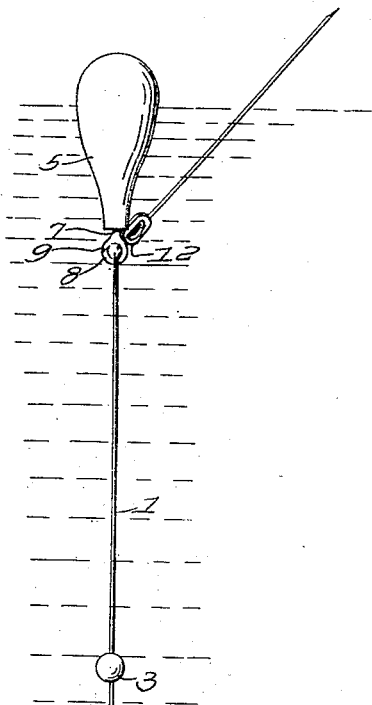
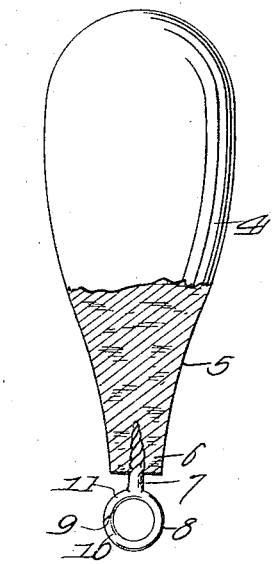
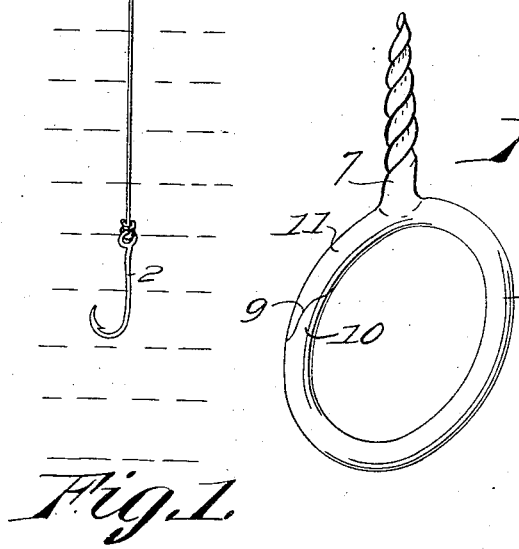
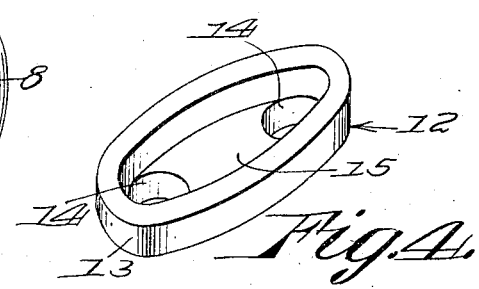
Inventor
E. S. Watson,
By Talbert & Parker
Attorneys

UNITED STATES PATENT OFFICE.

EDDIE SWIFT WATSON, OF BATTLE CREEK, MICHIGAN.

FISHING APPARATUS.

1,284,508.   Specification of Letters Patent.   Patented Nov. 12, 1918.

Application filed August 10, 1917. Serial No. 185,580.

*To all whom it may concern:*

Be it known that I, EDDIE SWIFT WATSON, a citizen of the United States, residing at Battle Creek, in the county of Calhoun and State of Michigan, have invented certain useful Improvements in Fishing Apparatus, of which the following is a specification, reference being had therein to the accompanying drawing.

The present invention has reference generally to improvements in that class of inventions known as fishing and trapping and more particularly relates to an improvement in a fishing apparatus.

As a primary aim and object this invention contemplates the provision of an improved float embodying a body and means connected to one end of the body for slidable and removable engagement with the fishing line, coöperative means being mounted on the fishing line for limiting the movement of the float on the line and also serving as a means for adjustably regulating the distance between the float and the sinker when the apparatus is in position for a catch.

It is an additional object of this invention to so construct the connecting means of the float body that it may be applied to and removed from the line when the other parts are in position, thus obviating the usual inconvenience of disconnecting the weight preparatory to attaching a float.

Among the other aims and objects of the invention may be recited the provision of a device of the character mentioned with a view to compactness, and in which the number of parts are few, the construction simple, the cost of production low and the efficiency high.

Other objects as well as the nature, characteristic features and scope of this invention will be more readily apparent from the following description taken in connection with the accompanying drawings, and pointed out in the claim forming a part of this specification.

The invention is clearly illustrated in the accompanying drawings, in which:—

Figure 1 is a view of the fishing apparatus assembled and in position in the water showing the relative position of the parts.

Fig. 2 is an enlarged vertical section taken through the float body.

Fig. 3 is an enlarged perspective of the line receiving element carried by the float body.

Fig. 4 is an enlarged perspective detail of the adjustable stop.

Similar characters of reference are employed in all of the above described views, to indicate corresponding parts.

Referring now more particularly to the accompanying drawings I provide a fishing line 1 on the lower end of which is connected a fishing hook 2 of any desired construction while a weight or sinker 3 is rigidly connected on the line in spaced relation to the hook.

With a view toward providing the improved float in the present instance I provide a body 4 formed of cork or other buoyant material the body being tapered and reduced as at 5 toward one end. Anchored in the reduced end 6 of the body is the threaded shank 7 of the improved line receiving hook. The resilient engaging end 8 of the hook is arcuate in configuration and has the free edge beveled inwardly as indicated by the numeral 9 and normally arranged in abutting relation with the correspondingly beveled edge 10 of the arcuate guard 11 integral with the shank 7 at a point directly opposite the point from which the engaging end extends. Owing to the resiliency of the engaging end this part may be readily pushed inwardly to provide a slot between the adjacent beveled edges to consequently permit of the insertion of a fishing line therein. Of course it is only necessary to push this engaging end inwardly to permit of the removal of the float when so desired. This quick attaching means obviates the necessity of providing a sectional line which is customary in present fishing devices in order to apply a float of the usual construction. For the purpose of limiting the movement of the float with respect to the line and to consequently regulate the distance between the weight and the float I have provided an improved adjustable stop 12 as illustrated in Fig. 4. This stop consists of a relatively flat body 13 having spaced openings 14 therein between which extends a longitudinally arranged groove 15. The fishing line is passed through the openings and lies in the groove and by this arrangement the stop is adjustable on the line and is held in an adjusted position due to the frictional engagement thereof.

The operation of the invention may be reviewed as follows:

Assuming that the parts have been assembled in the manner described and it is desired to cast the apparatus, the upward movement of the float on the line will be limited by the sinker, the combined weight of the sinker and the float facilitates the effective throwing or casting of the line. When the parts strike the water the sinker moves downwardly while the float owing to its slidable connection will be arranged upon the upper surface of the water, the movement of the line through the float being limited by the stop which engages the line receiving hook which is in effect a snap hook. Owing to the construction and relation of the line and hook the line can be readily jerked without seriously agitating the water since the line readily slips through the hook.

It is thought that the advantages of this invention when in use are readily apparent. However, some of the advantages may be enumerated as follows: (1) By the provision of the line receiving element the float can be removably attached to the line subsequent to the assembling of the other parts it being unnecessary to disconnect the weight and hook; (2) the comparatively small hook reduces friction between the line and the float to a minimum, consequently permitting of a quick assemblage of parts into proper relation subsequent to casting the apparatus.

It will be understood that the above description and accompanying drawings comprehend only the general and preferred embodiment of my invention and that various minor changes in detail of construction, proportion and arrangement of the parts may be made within the scope of the appended claim and without sacrificing any of the advantages of my invention.

Having thus fully described my invention, what I claim as new and desire to secure by Letters-Patent, is:—

As a new article of manufacture a stop consisting of a relatively flat body, said body being elliptical in shape, and being cored out so as to provide an elliptical groove therein having a flat bottom, the bottom of said groove being formed at opposite ends with openings each having its diameter substantially equal to the adjacent width of said body.

In testimony whereof I affix my signature.

EDDIE SWIFT WATSON.

Copies of this patent may be obtained for five cents each, by addressing the "Commissioner of Patents, Washington, D. C."